United States Patent
Wibbeke et al.

(10) Patent No.: US 8,414,087 B2
(45) Date of Patent: Apr. 9, 2013

(54) MOTOR VEHICLE AXLE COMPONENT AND METHOD FOR PRODUCING A MOTOR VEHICLE AXLE COMPONENT

(75) Inventors: Michael Wibbeke, Paderborn (DE); Jürgen Krogmeier, Hövelhof (DE)

(73) Assignee: Benteler Automobiltechnik GmbH, Paderborn (DE)

(*) Notice: Subject to any disclaimer, the term of this patent is extended or adjusted under 35 U.S.C. 154(b) by 342 days.

(21) Appl. No.: 12/859,666

(22) Filed: Aug. 19, 2010

(65) Prior Publication Data

US 2011/0227402 A1   Sep. 22, 2011

(30) Foreign Application Priority Data

Aug. 19, 2009   (DE) .................. 10 2009 037 905

(51) Int. Cl.
*B60B 35/00* (2006.01)
(52) U.S. Cl.
USPC ........................................... 301/124.1
(58) Field of Classification Search ............... 301/124.1, 301/127, 129; 280/124.116, 124.166, 124.175
See application file for complete search history.

(56) References Cited

U.S. PATENT DOCUMENTS

| | | | | |
|---|---|---|---|---|
| 1,236,145 A | * | 8/1917 | Burns | 285/286.1 |
| 2,389,712 A | * | 11/1945 | Ash | 301/124.1 |
| 2,452,659 A | * | 11/1948 | Huldt | 295/36.1 |
| 2,957,706 A | * | 10/1960 | Hanley | 280/124.13 |
| 6,086,162 A | * | 7/2000 | Pinch et al. | 301/124.1 |
| 7,370,872 B2 | * | 5/2008 | Abrat et al. | 280/124.116 |
| 2008/0265626 A1 | | 10/2008 | Dörr et al. | |
| 2008/0272569 A1 | | 11/2008 | Renard et al. | |
| 2008/0314509 A1 | | 12/2008 | Criqui et al. | |

FOREIGN PATENT DOCUMENTS

| | | |
|---|---|---|
| DE | 242 874 A1 | 2/1987 |
| DE | 195 20 520 A1 | 12/1995 |
| DE | 195 38 226 C2 | 7/1998 |
| DE | 203 09 455 U1 | 10/2003 |
| EP | 1 036 680 B1 | 3/2000 |
| JP | 2008-516835 | 5/2008 |
| JP | 2009-501112 | 1/2009 |

* cited by examiner

*Primary Examiner* — Kip T Kotter
(74) *Attorney, Agent, or Firm* — Henry M. Feireisen LLC.

(57) ABSTRACT

The invention relates to a motor vehicle axle component and a method for producing a motor vehicle axle component. The axle component, for example a dead beam axle, includes a light metal body, such as aluminum or magnesium or corresponding alloys, and a tubular body in form of a steel tube, which are adhesively connected with each other. An adhesive pocket filled with an adhesive is formed between an end of the tubular body and a cylindrical receptacle of the light metal body. Respective bezels are arranged on a free end of the receptacle and on a free end of the tubular body. The spaces between the respective bezels and adjacent walls are filled with adhesive, which seals the interior and exterior transition regions of the joint zone, thus protecting the joint zone against corrosion, improving the load characteristic of the axle component and increasing its service life.

14 Claims, 6 Drawing Sheets

MOTOR VEHICLE AXLE COMPONENT AND METHOD FOR PRODUCING A MOTOR VEHICLE AXLE COMPONENT

CROSS-REFERENCES TO RELATED APPLICATIONS

This application claims the priority of German Patent Application, Serial No. 10 2009 037 905.3, filed Aug. 19, 2009, pursuant to 35 U.S.C. 119(a)-(d), the content of which is incorporated herein by reference in its entirety as if fully set forth herein.

BACKGROUND OF THE INVENTION

The invention relates to a motor vehicle axle component with a light metal body and a tubular body, which are adhesively connected with one another, wherein an adhesive pocket filled with an adhesive is formed between one end of the tubular body and a cylindrical receptacle of the light metal body, and a method for producing such a motor vehicle axle component.

The following discussion of related art is provided to assist the reader in understanding the advantages of the invention, and is not to be construed as an admission that this related art is prior art to this invention.

The joint zones of the axle components are subjected to high static and dynamic loads during operation. This applies in particular to the joint zones of axle components having components made from different materials.

Based on the state-of-the-art, it is an object of the invention to improve a generic motor vehicle axle component with respect to, and to provide a method for producing such motor vehicle axle component.

It would therefore be desirable and advantageous to provide a motor vehicle axle component to obviate prior art shortcomings and to improve the load characteristics and expected service life.

SUMMARY OF THE INVENTION

According to one aspect of the present invention, a motor vehicle axle component includes a light metal body having a cylindrical receptacle, a tubular body adhesively joined to the light metal body, an adhesive pocket filled with an adhesive formed between a free end of the tubular body and the cylindrical receptacle, a first bezel arranged on a free end of the receptacle, wherein a first space disposed between the first bezel and an adjacent wall of the tubular body is filled with the adhesive, and a second bezel arranged on the free end of the tubular body, wherein a second space disposed between the second bezel and an adjacent wall of the light metal body is filled with the adhesive.

Accordingly, a bezel is provided on a free end of the receptacle of the light metal body and the space between the bezel and an adjacent wall of the tubular body is filled with adhesive. In addition, a bezel is also provided on the free end of the tubular body, wherein the space between the bezel at the end of the tubular body and an adjacent wall of the light metal body is filled with an adhesive.

By constructing the joint zone according to the invention and purposely sealing the interior and exterior transition regions of the joint zone with an adhesive, the joint zone is protected against corrosion. This improves the load characteristic of the motor vehicle axle component and extends its service life. In particular when different metallic material pairs are employed, i.e., with the joint formed between a light metal body and a tubular body made of steel, contact corrosion can be prevented by sealing the contact region between the light metal and the steel with the adhesive.

Adhesives may have the form of a single component adhesive or a two-component adhesive, in particular an epoxy resin adhesive. The adhesive may be thermosetting or cold-setting.

The geometric structure according to the invention employs a bezel both on the free end of the receptacle as well as on the free end of the tubular body. The bezel may be formed by an inclined face which may be a straight and/or curved.

Depending on the design of the motor vehicle axle component, the bezel is arranged on the interior circumference of the free end of the tubular body. The bezel may also be arranged on the exterior circumference of the free end of the tubular body.

Likewise, the bezel may be arranged on the free end of the receptacle on the exterior circumference of the receptacle or on the interior circumference of the receptacle.

Preferably, the bezel on the free end of the tubular body extends at an angle between 30° and 60° in relation to the end face of the tubular body.

The bezel on the free end of the receptacle extends at an angle between 20° and 60° in relation to the end face of the receptacle.

The light metal component, for example a longitudinal control arm, is preferably implemented as a cast part. In particular, the light metal body is made of aluminum, of an aluminum alloy, of magnesium or of a magnesium alloy.

The tubular component is preferably made of steel. In particular, the tubular component is a steel tube. A tubular component may also be at least partially fiber-reinforced, for example with carbon fibers. The tubular component may also be made of fiber-reinforced plastic or a plastic fiber composite. The tubular component may be uncoated or coated, for example with a cathaphoretic coating.

The invention enables an adhesive joint between the tubular body and the light metal body which are made of different materials. The geometric design of the joint zone produces a longitudinal interference fit which provides optimal corrosion protection in the transition zone.

The joint is preferably configured round or oval. In particular, the receptacle on the light metal body is formed as a pin which receives the free end of the tubular body. The pin may be inserted in the end of the tubular body or can surround the free end of the tubular body on the outside.

The light metal body and the tubular body are preferably processed by cutting or metal removal. The adhesive pocket is preferably formed by a circumferential annular groove in the receptacle. The depth of the adhesive pocket may be between 0.2 to 1.0 mm and has preferably a depth of 0.5 mm.

The joint faces of the light metal body are subjected to a surface treatment, in particular passivation, before being joined. This also improves corrosion protection and increases the fatigue strength of the adhesive joint. Passivation is performed by applying a suitable passivation solution, which produces a conversion layer (passive layer) composed of oxides of the passivation solution and the base material. The passive layer is uniform and conforms to the contour of the joint face on the light metal body. The passive layer has a layer thickness of less than 1 μm.

The surface pretreatment can also be performed using plasma technology, in particular atmospheric pressure plasma pretreatment. The activation significantly increases the adhesion of the adhesive in the region of the following joint zone.

According to another aspect of the invention, a method for producing a motor vehicle axle component includes the steps of producing a first bezel on a free end of a receptacle disposed on a light metal body, producing a second bezel on a free end of a tubular body, receiving the light metal body in a processing station, supplying the tubular body to the processing station, applying an adhesive on at least one of the receptacle and an end of the tubular body, bringing together the receptacle and the free end of the tubular body in the processing station, and removing the motor vehicle axle component from the processing station.

The method according to the invention is cost-effective and allows an economical production of high-quality motor vehicle axle components from parts made of two different materials which are adhesively joined with one another.

The adhesive is applied fully automatically on the receptacle and/or the end of the tubular body in the processing station. The processing station includes at least one adhesive application apparatus which can be moved along a traverse of the processing station and can hence service both sides of the processing station. The processing station can also have a separate adhesive application apparatus on each side, which obviates the need top move the adhesive application apparatus. This is advantageous for the cycle time as well as for the maintenance and the like.

As described above, to enhance the adhesion of the adhesive, at least the joint face of the light metal body is subjected to surface pretreatment, preferably passivation or activation with a passivation solution, a pickling process or a plasma treatment, before the adhesive is applied.

Before the end of the tubular body is pressed into or onto the receptacle of the light metal body, the interior diameter of the tube may be calibrated.

The receptacle is formed as a pin protruding from the light metal body. Preferably, the light metal body is rotated when the adhesive is applied or deposited. The adhesive is deposited in the region of the joint zone of the receptacle.

After the adhesive is deposited, the receptacle and the end of the tubular body are brought together in the processing station. In particular, the end of the tubular body is pressed onto or into the receptacle, producing a longitudinal interference fit. Excess adhesive is then removed after the receptacle and the end of the tubular body have been brought together.

In particular, the adhesive pocket is filled with adhesive of a quantity sufficient so that a portion of the adhesive is moved to the end position of the components, when the receptacle and the end of the tubular component are pushed or pressed together, so as to provide an adequate adhesive and sealing action by filling the space between the bezel on the receptacle and the adjacent wall of the tubular body as well as the space between the bezel on the free end of the tubular body and the adjacent wall of the light metal body with adhesive.

Preferably, the end of the tubular body is moved into the receptacle until it stops, i.e., the tubular body is moved to a stop at an end face in or on the light metal body. With the application of the adhesive according to the invention and the available quantity of adhesive, the tubular component may also be pressed on by controlling the insertion depth, so that the end face of the tubular body makes partial contact with the frontally opposing face of the light metal body. In this way, the corrosion and leakage properties are not impaired in the transition region between the tubular body and the light metal body.

The adhesive may be cured, for example, by rapid induction curing in the processing station, before the motor vehicle axle component is removed from the processing station. Economically, the adhesive can also be cured after the motor vehicle axle component has been removed from the processing station. This can be combined, in particular, with a surface coating process of the motor vehicle axle component, for example during cathaphoretic coating.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
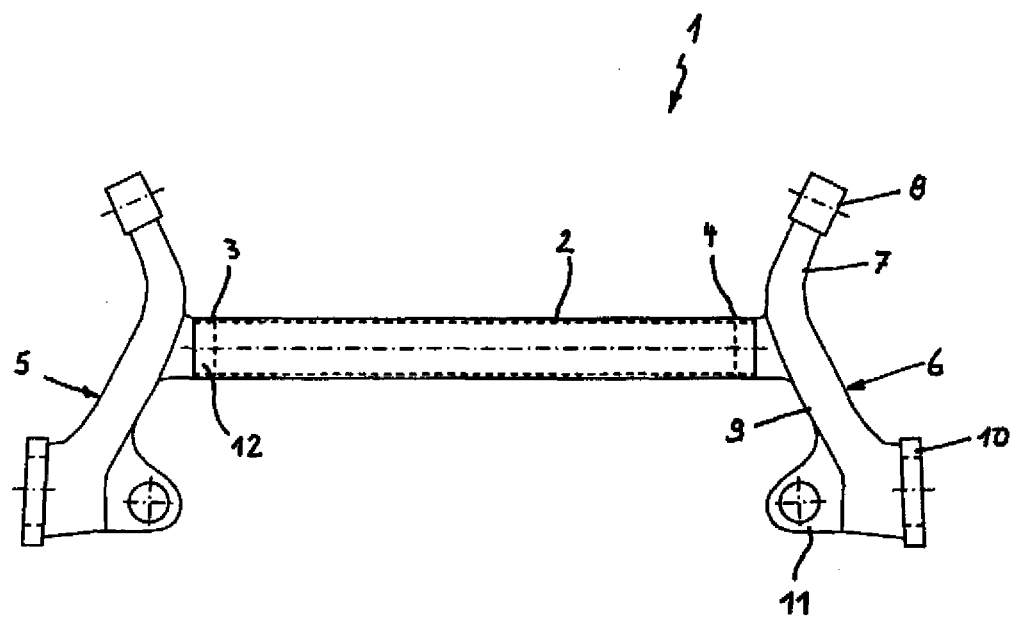
FIG. 1 shows a motor vehicle axle component according to the invention in form of a torsion beam axle or dead beam axle in a top view.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle axle component according to the invention in form of a torsion beam axle or dead beam axle 1.

The dead beam axle 1 has a tubular body 2 made of steel and operating as a torsion profile, with a respective light metal body 5, 6 adhesively joined at respective ends of the tubular body 2 in one-to-one correspondence. The light metal bodies 5, 6 are made of a light metal cast, in particular aluminum or magnesium cast, and form the longitudinal control arms of the dead beam axle 1 carrying the wheels. The tubular component 2 may also be fiber-reinforced, for example with carbon fibers or may be made from a plastic-fiber composite.

The light metal bodies 5, 6 and the longitudinal control arms, respectively, have a curved longitudinal profile, with a bearing bushing 8 for installing a silent bearing being provided on its front longitudinal segment 7, and a wheel carrier 10 and a spring strut support 11 being arranged on its rear longitudinal segment 9.

In the transition region between the front and the rear longitudinal segment 7, 9, a cylindrical receptacle 12 in form of a pin is formed as one piece with each light metal body 5, 6.

The connection between the tubular body 2 and the light metal bodies 5, 6 is established via the receptacles, on which the corresponding end 3, 4 of the tubular body 2 is placed and adhesively joined. A one component or two-component adhesive can be used as an adhesive K, in particular an epoxy resin adhesive.

Figure 6:
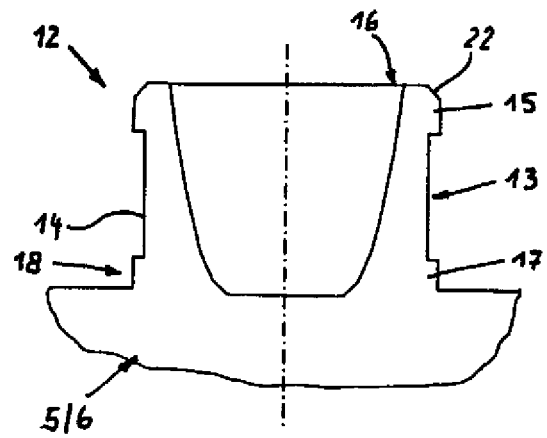
FIG. 6 shows a detail of the light metal body showing the receptacle of the light metal body with a bezel formed on the exterior circumference of the free end of the receptacle.
Figure 7:
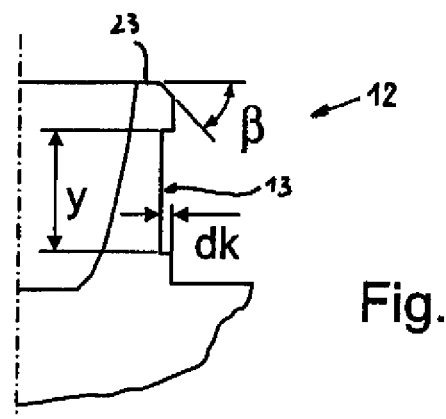
FIG. 7 shows a detail of the illustration of FIG. 6.
Figure 8:
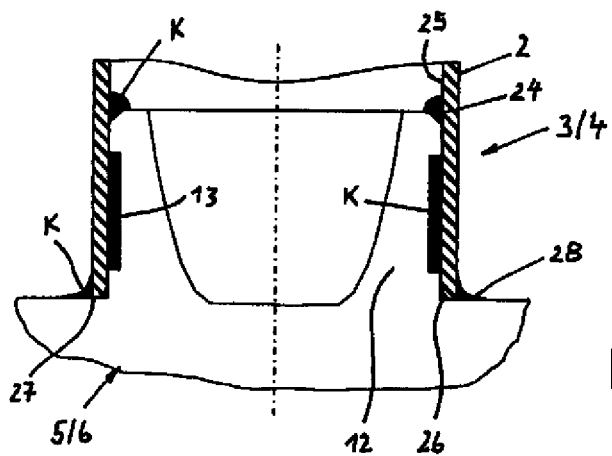
FIG. 8 shows the joint region between the light metal body and the end of the tubular body.

As clearly seen in FIGS. 6 to 8, an adhesive pocket 13 filled with an adhesive K is provided on the receptacle 12. The adhesive pocket 13 is implemented as a circumferential groove 14 on the exterior circumference of the receptacle 12. The depth dk of the adhesive pocket 13 can be between 0.2 mm and 1 mm. Preferably, the adhesive pocket 13 has a depth of 0.5 mm. The axial length y of the adhesive pocket 13 is designed to match the type and magnitude of the load in the joint region. The adhesive pocket 13 is delimited by a shoulder 15 disposed on the free end 16 of the receptacle 12 and a shoulder 17 on the interior end 18 of the receptacle 12.

FIGS. 2 to 5 show four different embodiments of a free end 3 and 4, respectively, of the tubular body 2. All embodiments have in common that a bezel 19, 20 is arranged on the free end 3 and 4, respectively, of the tubular body 2.

Figure 2:
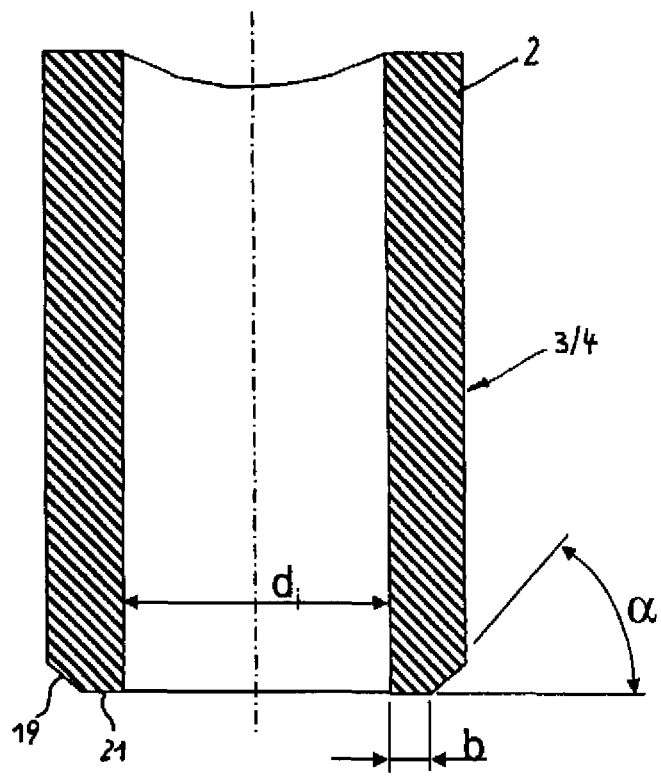
FIG. 2 shows the free end of the tubular body in a vertical cross-section.

With the configuration of the end 3 and 4, respectively, according to FIG. 2, the bezel 19 is arranged on the exterior circumference of the tubular body 2. The bezel 19 is formed by an inclined circumferential face and forms an angle a between 30° and 60° with respect to the end face 21 of the tubular body 2. The width of the end face 21 is indicated with the letter b. In practice, the width b is selected to be between 0.5 mm and 1.0 mm. Also indicated in FIG. 2 with $d_i$ is the interior diameter of the tubular component 2.

Figures 3, 4, 5:
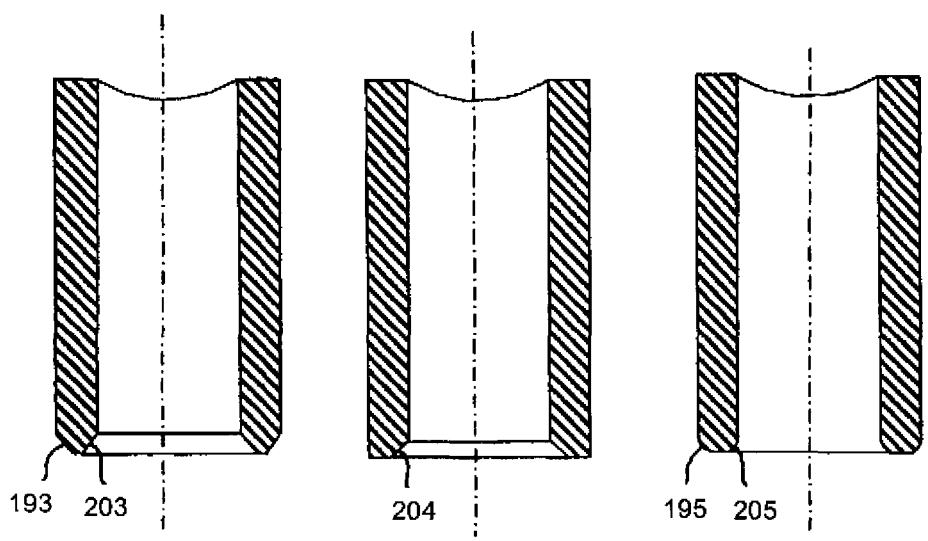
FIGS. 3 to 5 show three additional modified embodiments of the end of a tubular body, also in a vertical cross-section.

With the free end 3, 4 of the tubular body 2 having the form illustrated in FIG. 3, a first bezel 193 in form of an inclined face is arranged on the exterior circumference of the tubular body 2 and a second bezel 203 is arranged on the interior circumference of the tubular body 2.

The end 3, 4 of the tubular body 2 according to FIG. 4 has a bezel 204 on the interior circumference.

As illustrated in FIG. 5, the free end 3 and 4, respectively, has bezels 195, 205 which are each formed by a curved surface and are located on both the interior circumference and the exterior circumference.

Figure 6A:
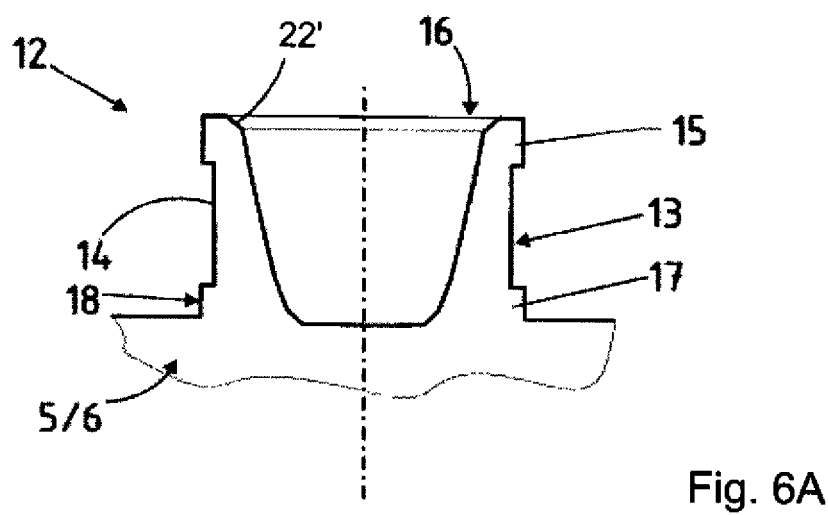
FIG. 6A shows a detail of the light metal body showing the receptacle of the light metal body with a bezel formed on the interior circumference of the free end of the receptacle.

As shown in FIGS. 6, 6A and 7, a bezel 22, 22' is also formed on the free end 16 of the receptacle 12. In the illustrated exemplary embodiment of FIG. 6, the bezel 22 is configured as an inclined surface on the exterior circumference of the free end 16 of the receptacle 12. In the illustrated exemplary embodiment of FIG. 6A, the bezel 22' is configured as an inclined surface on the interior circumference of the free end 16 of the receptacle 12. The angle of the bezel 22 with respect to the end face 23 of the receptacle 12 is indicated with β. The angle β is between 20° and 60°, preferably about 30°.

Both bezels 19, 20 on the free ends 3 and 4, respectively, of the tubular component 2 and the bezel 22 as well as the adhesive pocket 13 on the receptacle 12 are produced by metal-cutting machining of the corresponding starting and intermediate components.

FIG. 8 shows the joint region between the tubular component 2 and the light metal body 5, 6. The tubular component 2 is pressed with its free end 3, 4 onto the receptacle 12 and joined with an adhesive K. As can be seen, the adhesive pocket 13 is completely filled with adhesive K. The space 24 between the bezel 22 on the free end 16 of the receptacle and the adjacent wall 25 of the tubular body 2 is also filled with adhesive K. Likewise, the space 26 between the bezel 19, 20 on the free end 3, 4 of the tubular body 2 and the adjacent wall 27 of the light metal body 5, 6 are also filled with the adhesive K. This produces a joint between the ends 3, 4 of the tubular body 2 and the receptacles 12 of the light metal body 5, 6. FIG. 8 also illustrates clearly that the adhesive K can also be provided in the seam 28 between the exterior circumference of the end 3, 4 of the tubular body 2 and the light metal body 5, 6. Overall, the interior and exterior transition regions of the joint zone are sealed by the adhesive K and protected against corrosion. This is particularly important when employing the different materials.

Figure 9:
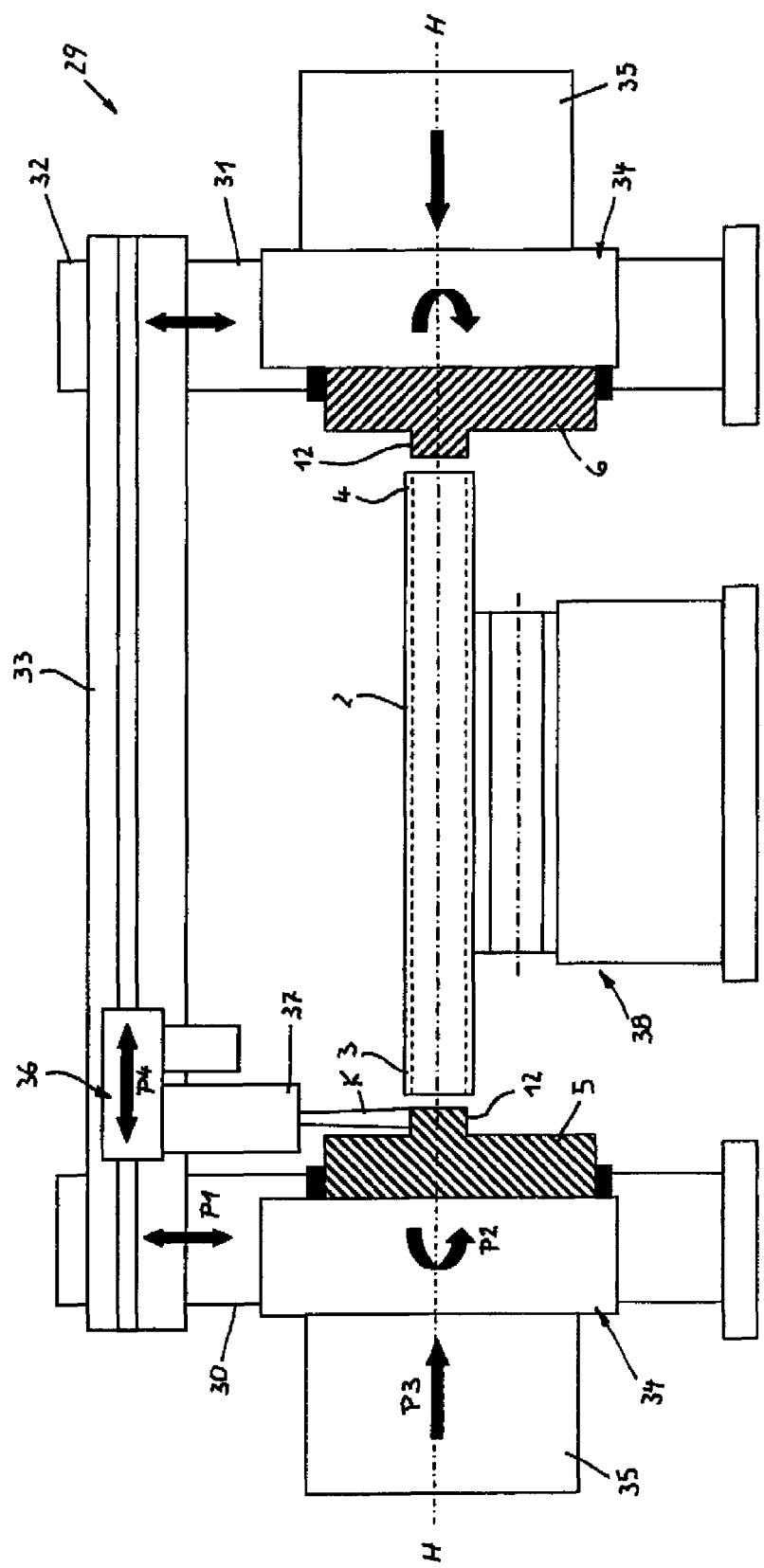
FIG. 9 shows a technically simplified diagram of a facility for producing a motor vehicle axle component.
Figure 10:
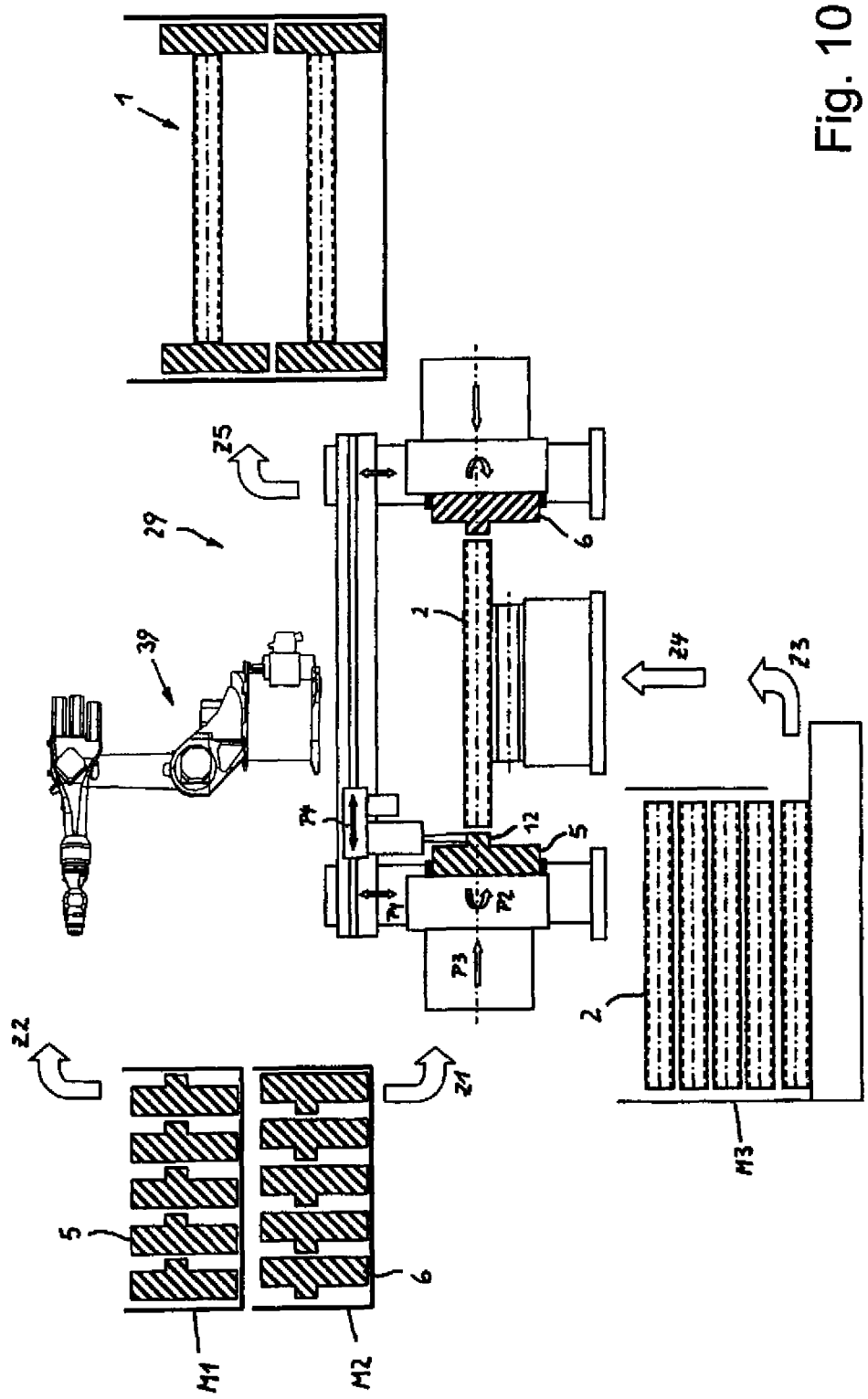
FIG. 10 shows a process flow for producing a motor vehicle axle component.

FIGS. 9 and 10 show a schematic facility diagram of a processing station 29 and the process flow for producing a motor vehicle axle component 1.

As illustrated in FIGS. 9 and 10, the processing station 29 includes fundamentally two lateral support columns 30, 31, with a height-adjustable (arrow P1) crossbeam 33 extending between the upper ends 32 of the support columns 30, 31. A clamping unit 34 for receiving a light metal body 5, 6 is provided on each support column 30, 31. The clamping unit 34 is rotationally supported, as indicated by the arrow P2, and is axially displaceable with pressure units 35, as indicated by the arrow P3, and vice versa.

A longitudinally movable adhesive application device 36 with a nozzle 37 is arranged on the crossbeam 33. The movability is illustrated by the arrow P4. Basically, an adhesive application device 36 may be provided on each side of the processing station 29, which obviates the need for moving the adhesive application device. This is particularly advantageous for the cycle time.

Also illustrated is a conveying device 38 for supplying the tubular body 2. The conveying device 38 is preferably a roller conveyor.

Light metal bodies 5, 6 are provided for producing a motor vehicle axle component 1. M1 and M2 in FIG. 10 indicate the magazines with the prepared light metal bodies 5, 6. The light metal bodies 5, 6 have a hollow-cylindrical opening 12, with a bezel 22 according to the illustration in FIGS. 6 to 8 produced at their free ends 16 by material removal. The light metal bodies 5, 6 also have an adhesive pocket 13, as also illustrated in FIGS. 6 to 8.

The tubular bodies 2 are stored in a magazine M3. The tubular bodies 2 are made of steel and may be uncoated or coated. The free ends 3, 4 of the tubular body 2 are machined by metal cutting and provided with a bezel 19, 20, as described with reference to FIGS. 2 to 5.

The light metal bodies 5, 6 are picked up by a robot 39 and positioned to the left and to the right in the clamping units 34. This process is indicated by the arrows Z1 and Z2. When the components are positioned in the clamping units 34, adhesive K is supplied on the receptacles 12. This is done with the adhesive application device 36. In the illustrated exemplary embodiment, adhesive is first applied on a light metal body 5, as illustrated in the left half of the image of FIG. 9 and in FIG. 10. The adhesive application device 36 is subsequently moved to the right—with reference to the direction of the Figure—along the crossbeam 33, and the adhesive K is applied on the receptacle 12 of the second light metal body 6. While the adhesive is applied, the light metal bodies 5, 6 are rotated about the axis H by the clamping unit 34, so that adhesive is evenly distributed along the circumference of the adhesive pocket 13.

Figure 11:
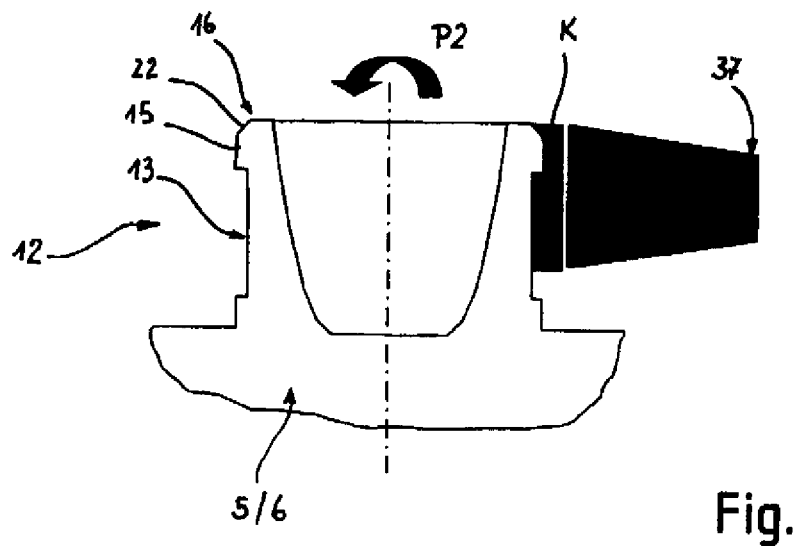
FIG. 11 shows the receptacle of the light metal body according to the illustration of FIG. 6 during application of adhesive in analogy to the illustration in FIG. 9.

Reference is made to FIG. 11 for a further description of the adhesive application. FIG. 11 shows the light metal body 5, 6 during application of adhesive K, with the light metal bodies 5, 6 being rotated. The rotation is indicated by the arrow P2. The adhesive is applied on the receptacle 12 with a flat nozzle 37 as a flat bead, covering with the adhesive K the free end 16 with the bezel 22, the shoulder 15 and a portion of the adhesive pocket 13. A sufficient quantity of adhesive K is selected so that the adhesive K is spread when an end 3, 4 of the tubular component 2 is pressed onto the receptacle 12, filling the adhesive pocket 13 as well as the space 24 and the space 26 and sealing the seam 28, as illustrated in FIG. 8.

The tubular bodies 2 are removed from the magazine M3 with a manipulator and transferred via the conveying device 38 to the processing station 29, as indicated by the arrows Z3, Z4. The tubular bodies 2 are positioned in the processing station 29 under control of clock pulses, and the light metal bodies 5, 6 with the adhesive K are axially displaced by applying a pressure with the pressure units 35, whereby the receptacles 12 are pressed into the free ends 3, 4 of the tubular body 2.

The motor vehicle axle component 1 joined in this manner is then removed (arrow Z5) and transported for further processing or further use.

Before the adhesive joint is formed, the interior diameter $d_i$ of the ends 3, 4 of the tubular body 2 can be calibrated.

The joint faces of the light metal body 5, 6 and the joint faces of the receptacles 12 on the light metal body 5, 6, respectively, may be subjected to a surface treatment before applying the adhesive. In particular, passivation can be contemplated, whereby a thin, nonporous oxide cover layer is produced.

During the process, in which the ends 3, 4 of the tubular body are pressed into or onto the receptacles 12 of the light metal body 5, 6, the joint zone is coated with adhesive, and the space 24 between the bezel 22 on the free end 16 of the receptacle 12 and the adjacent wall 25 of the tubular body 2, as well as the space 26 between the bezel 19, 20 on the free end 3, 4 of the tubular body 2 and the adjacent wall 27 of the light metal body 5, 6, are also filled with adhesive K, in addition to the adhesive pocket 13. Excess adhesive is scraped off. Depending on the application or the product, the adhesive can also remain on the component.

The adhesive K can optionally be cured in the processing station 29. However, the adhesive K is preferably cured outside the processing station 29, after the motor vehicle axle component 1 has been removed. Curing can also be combined with application of a surface coating on the motor vehicle axle component 1, for example a cathaphoretic coating.

A highly stable, durable adhesive joint between the light metal bodies 5, 6 and the tubular component 2, which are made of different materials, is produced. The interior and exterior transition regions of the joint zone are sealed by the adhesive K and protected against corrosion.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle axle component, comprising:
   a light metal body having a cylindrical receptacle;
   a tubular body adhesively joined to the light metal body;
   an adhesive pocket filled with an adhesive formed between a free end of the tubular body and the cylindrical receptacle;
   a first bezel arranged on a free end of the receptacle, wherein a first space disposed between the first bezel and an adjacent wall of the tubular body is filled with the adhesive, and
   a second bezel arranged on the free end of the tubular body, wherein a second space disposed between the second bezel and an adjacent wall of the light metal body is filled with the adhesive.

2. The motor vehicle axle component of claim 1, wherein the second bezel is arranged on an interior circumference of the tubular body.

3. The motor vehicle axle component of claim 1, wherein the second bezel is arranged on an exterior circumference of the tubular body.

4. The motor vehicle axle component of claim 1, wherein the first bezel is arranged on an exterior circumference of the receptacle.

5. The motor vehicle axle component of claim 1, wherein the first bezel is arranged on an interior circumference of the receptacle.

6. The motor vehicle axle component of claim 1, wherein the second bezel extends at an angle between 30° and 60° with respect to an end face of the tubular body.

7. The motor vehicle axle component of claim 1, wherein the first bezel extends at an angle between 20° and 60° with respect to an end face of the receptacle.

8. The motor vehicle axle component of claim 1, wherein the adhesive pocket is formed by an annular groove in the receptacle.

9. The motor vehicle axle component of claim 1, wherein the tubular body is made of steel.

10. The motor vehicle axle component of claim 1, wherein the tubular body is fiber-reinforced.

11. The motor vehicle axle component of claim 10, wherein the tubular body is made of fiber-reinforced plastic.

12. The motor vehicle axle component of claim 1, wherein the light metal body is made of aluminum or an aluminum alloy.

13. The motor vehicle axle component of claim 1, wherein the light metal body is made of magnesium or a magnesium alloy.

14. The motor vehicle axle component of claim 1, wherein faces of the light metal body joined to the tubular body are passivated.

* * * * *